Nov. 4, 1952 E. M. WILLIAMS 2,617,015

PANORAMIC SYSTEM

Filed Jan. 23, 1945 2 SHEETS—SHEET 1

Inventor
EVERARD M. WILLIAMS
BY
William D. Hall
Attorney

INVENTOR.
EVERARD M. WILLIAMS
BY
William D. Hall.
ATTORNEY

Patented Nov. 4, 1952 2,617,015

UNITED STATES PATENT OFFICE 2,617,015

PANORAMIC SYSTEM

Everard M. Williams, State College, Pa.

Application January 23, 1945, Serial No. 574,166

20 Claims. (Cl. 250—13)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio devices and more particularly to a combined scanning radio receiver and jamming transmitter.

The objects of the present invention comprise the provision of a combined scanning receiver and jamming transmitter that detects and jams one or a plurality of intercepted enemy signals with a minimum of time delay; a receiver-transmitter that, upon a change in the frequency of a signal being jammed, is adapted for promptly jamming the intercepted signal of new frequency; a receiver-transmitter that is substantially exclusively responsive to the peak or maximum strength of a controlling pulse signal which thereby insures precision in the jamming operation; a receiver-transmitter that stores or retains an intercepted signal for an appreciable length of time; a receiver-transmitter wherein the output signals of the receiver and of the transmitter both appear on the screen of a cathode ray tube as visibly differentiated deflections of the base line; a receiver-transmitter adapted for storing a record of the approximate frequency of the intercepted signals and subsequently transmitting over a band that is inclusive of the frequency of the signals stored; and a circuit element whereby the band containing the intercepted signals is intermittently swept over by the scanning receiver and the transmitter re-tuned as changes are found to have taken place in the frequency of the signal being jammed but by which the tuning of the transmitter is not changed if the signal to be jammed is found not to have changed in frequency.

Figure 1:
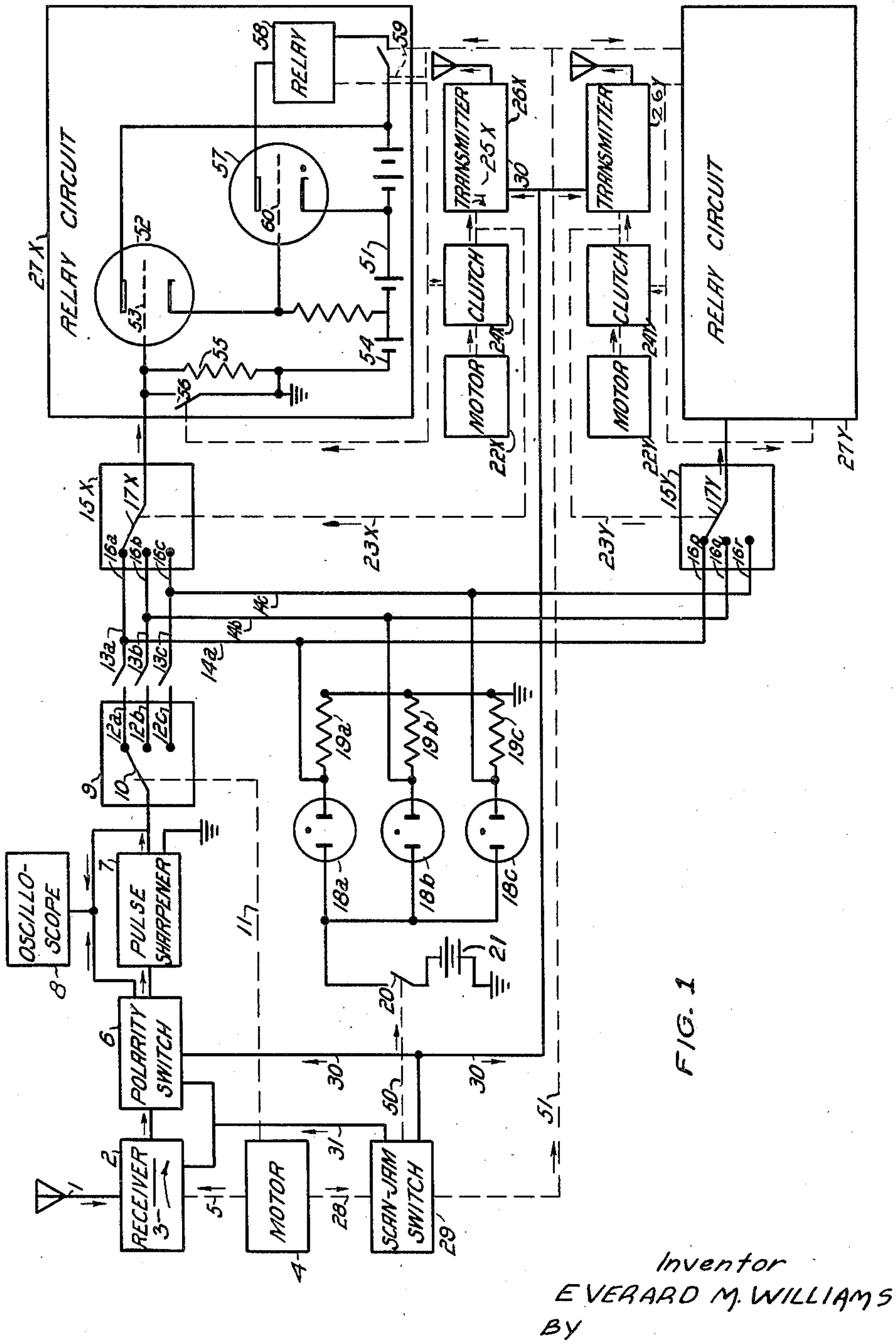
Figure 2:
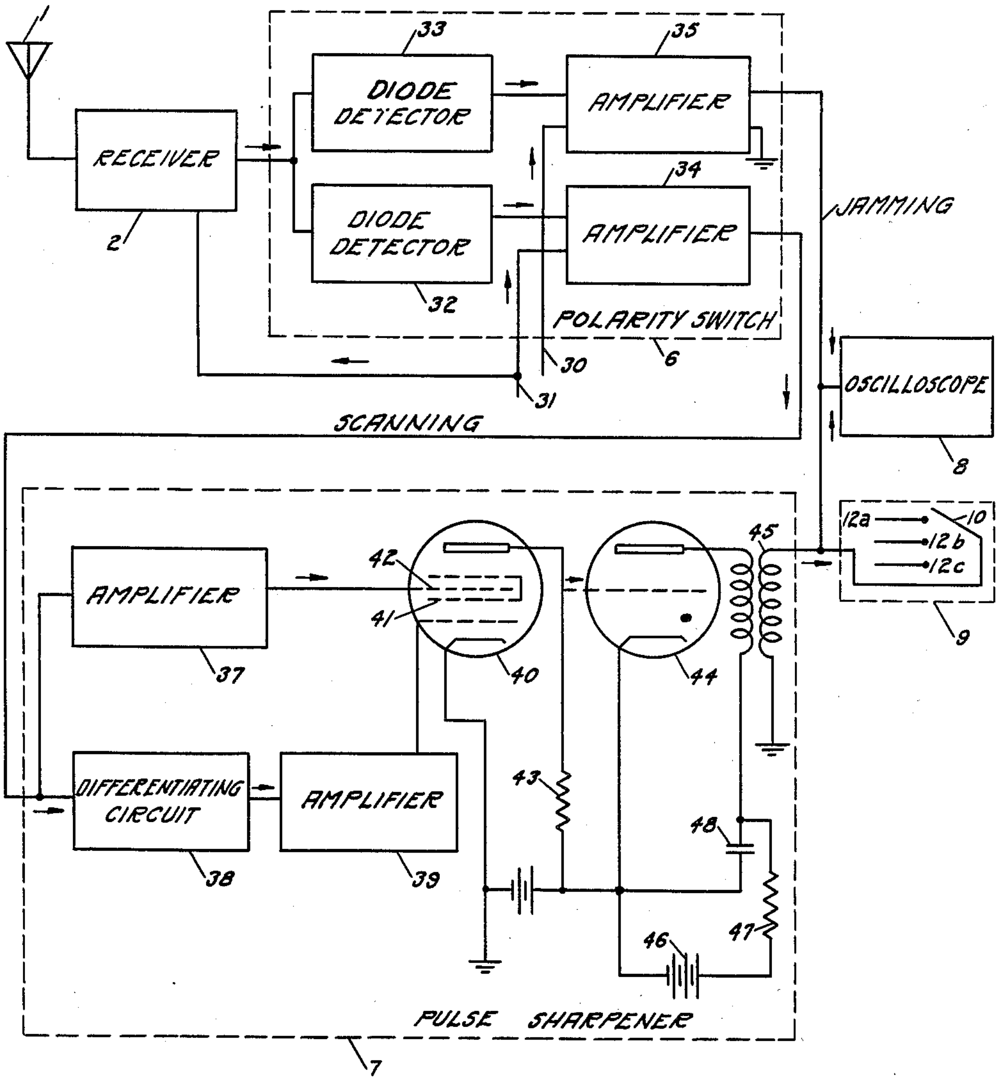

With the above and other objects in view which will be apparent to those who are informed in the field of radio from the following discussion, a suitable illustrative circuit for the present device is shown in the accompanying drawing, wherein:

Fig. 1 is a diagrammatic and schematic presentation of a circuit for a device that embodies the present invention; and Fig. 2 is a diagrammatic and schematic presentation of a polarity switch and of a pulse sharpener which form parts of the device circuit that is shown in Fig. 1.

In Fig. 1 of the accompanying drawing signal is intercepted by a receiving antenna 1, and passed to a scanning receiver 2 that is provided with a variable tuning element 3. The sweep of the variable tuning element 3 scans the frequency range of the receiver 2. The variable tuning element 3 is driven by a motor 4 through a mechanical interconnection 5. The output of the receiver 2, which will be in the nature of a pulse, is passed to a polarity switch 6 and thence alternatively to an oscilloscope 8 or to a pulse sharpener 7.

Signal is passed from the pulse sharpener 7 to the oscilloscope 8, and in parallel to a channel selector switch 9. The channel selector switch 9 comprises a rotating switch arm 10 that is driven thru a mechanical interconnection 11 by the motor 1 in synchronism with the tuning element 3 of the scanning receiver 2.

The switch arm 10 is mounted to travel over a plurality of stationary contacts 12*a*, 12*b*, 12*c*, etc. which are connected respectively thru a corresponding plurality of keys 13*a*, 13*b*, 13*c*, etc., to a corresponding plurality of channel conductors 14*a*, 14*b*, 14*c*, etc. The channel conductors 14*a*, 14*b*, 14*c*, etc. correspond in number to the number of channels into which the frequency range of the scanning receiver 2 is to be considered sub-divided. Inasmuch as only a finite number of channel conductors can be provided, each channel has a finite band width. For an illustrative overall scanning range of from 2 to 8 mc., in the receiver 2, sixty channels, having individual band widths of substantially 100 kc. may be provided.

Jamming signals from individual transmitters 26*x* and 26*y* should then have a band width spread of something greater than 100 kc.

The channel conductors 14*a*, 14*b*, 14*c*, etc., lead to switch boxes 15*x* and 15*y* as shown where two transmitters 26*x* and 26*y* serve the sixty channels 12*a*, 12*b*, 12*c*, etc. The channel conductor 14*a* terminates at a contact 16*a* in the transmitter selector switch box 15*x*, and at a parallel contact 16*p* in the transmitter selector switch 15*y*, and similarly for every other channel conductor 14*b*, 14*c*, etc., so that the rotating arm 17*x* of the transmitter selector switch box 15*x* sweeps over a set of contacts 16*a*, 16*b*, 16*c*, etc., that individually terminate all of the channel conductors 14*a*, 14*b*, 14*c*, etc. The rotating arm 17*y* of the transmitter switch box 15*y* sweeps over another set of contacts 16*p*, 16*q*, 16*r*, etc., that terminate in parallel all of the same channel conductors 14*a*, 14*b*, and 14*c*, etc. Each channel conductor 14*a*, 14*b*, 14*c*, etc. leads to one terminal of an associated neon tube 18*a*, 18*b*, 18*c*, etc., respectively. The opposite terminals of the neon tubes 18*a*, 18*b*, 18*c*, etc. lead thru resistors 19a, 19b, 19c, etc., respectively to ground. The first mentioned terminals of the neon tubes 18a, 18b, 18c, etc., are connected in common through a switch 20, that is normally closed, to a direct current voltage supply 21. The return circuit for the channel conductors 14a, 14b, 14c, etc., and for the direct current voltage supply 21 are made through ground connections.

The transmitter selector switch boxes 15x and 15y are each connected to substantially duplicate circuits. A description of the circuit that is connected to the transmitter selector switch box 15x may be taken as being representative of the circuit that is connected to the transmitter selector switch box 15y. A rotating arm 17x part of the transmitter switch box 15x is caused to travel over the contacts 16a, 16b, and 16c, by the operation of a mechanical connection 23x that operates through a clutch 24x that is operated by the shaft of a motor 22x. The switch box 15x carries signal to a relay circuit 27x. The motor 22x through the clutch 24x also varies the tuning element 25x in the transmitter 26x. Corresponding to the elements bearing the notation $x$ there is provided another set of like elements bearing the notation $y$.

The general phase of the present invention is to provide a device in which the receiver and the transmitter both independently scan through their respective tuning ranges. When the receiver in the course of its scan arrives at a frequency on which an external signal is intercepted, one of the channel conductors 14a, 14b, 14c, etc., that are associated with the frequency channel in which the intercepted signal falls, will be put into an active state.

The variable tuning element 25x of the transmitter 26x is arranged to synchronize with the sweep of the switch arm 17x over the contacts 16a, 16b, 16c, etc. so that the transmitter 26x sweeps through the frequency band of each channel at the same time that the arm 17x of the transmitter selector switch 15x makes contact with the terminal 16a, 16b, 16c, etc., on that channel conductor 14a, 14b, 14c, etc. that is associated with the respective channel that is involved. Signal from the respective channel conductor 14a, or 14b, or 14c, etc. which has been made active, passes through the contacts 16a, or 16b, or 16c, etc. to the relay circuit 27x and serves to stop the tuning sweep of the transmitter within the associated frequency channel and thus prepares it for transmission on the frequency of an intercepted signal.

The motor 4 controls, thru the mechanical connection 28, a scan-jam switch 29, the function of which is to alternate the operation of equipment in a cycle of two phases, (1) a scanning phase, and (2) a jamming phase. In the scanning phase, a blanking signal is placed upon the blanking circuit 30. This blanking signal serves to inactivate the transmitters 26x and 26y during the course of the scanning phase, and also to set the polarity switch 6 so as to give its pulse output a certain polarity. The scan-jam switch 29, at the beginning of the scanning phase, operates thru the mechanical connection 50 momentarily to open the switch 20 and thru the mechanical connection 51 to open momentarily the switches 59. During the jamming phase of the cycle, the blanking signal in the circuit 30 is removed, and a blanking signal is put upon the blanking circuit 31. The blanking circuit 31 operates to desensitize the receiver 2 during the course of the jamming phase, and also to set the pulse output of the polarity switch 6 in opposite polarity to that characterizing it during the scan phase. During the jamming phase the relay circuits 27x and 27y are unblocked. The scanning phase is preferably of short duration compared with the jamming phase.

The operation of one typical channel circuit 14a may be taken as being illustrative of the operation of the other channel circuits. During the course of the scanning phase, the switch 20 remains closed and the direct current voltage supply 21 is applied across the neon tube 18a, as well as across the other neon tubes, 18b, 18c, etc. This voltage is great enough to sustain discharge through the tube 18a, but is not great enough to initiate discharge. At the beginning of the scanning phase, the switch 20 has been momentarily opened, as has been explained, so that the tube 18a is normally not conducting.

Assuming that an external signal within the frequency channel of the channel circuit 14a is intercepted by the receiver 2. At the moment that the tuning element 3 tunes the receiver to that intercepted signal, the arm 10 of the channel selector switch 9 will be on the contact 12a, so that a pulse of signal voltage will be impressed upon the channel conductor. This signal will then be impressed across the neon tube 18a in series with the voltage of the voltage supply 21, the switch 20 being closed. If this occurs during the scanning phase, the polarity of this pulse is such as to increase the voltage across the neon tube 18a sufficiently to cause this tube to break down and to conduct. This conducting state continues after the passage of the pulse due to the characteristic operation of such tubes, and continues until the switch 21 is momentarily opened at the beginning of the next scanning cycle. During all the intervening time, the tube 18a discharges to ground through the resistor 19a. There is thus placed upon the contact 16a, a continuing activating voltage which arose due to the interception of a signal within the frequency channel that is associated with the channel conductor 14a. It is thus seen that the channel conductors 14a, 14b, 14c, etc., with their associated neon tubes 18a, 18b, 18c, etc. act as a mechanical memory to record the frequencies of all signals intercepted.

In the relay circuit 27x an input lead from the arm 17x of the transmitter selector switch 15x conducts signal to a grid 53 of a triode 52. The triode 52 serves as a buffer between the channel conductor circuits 14a, 14b, 14c, etc. and the circuit following it. The triode 52 is connected as a conventional amplifier. Its grid is negatively biased by a voltage supply 54 through a grid resistor 55. The negative terminal of the voltage supply 54 is grounded. A switch 56 that normally is open, provides, on occasion, a direct shorting path to ground for the switch arm 17x and the grid 53. The resistor 55 is large enough to prevent any substantial current flow from the channel conductors 14a, 14b, 14c, etc.

Signal is passed from the triode 52 to the grid 60 of a gas triode 57, through a cathode follower circuit as shown. The circuit of the gas triode 57 is the normal circuit of a gas triode. A negative voltage supply 51 in the grid circuit renders the tube 57 nonconducting in the absence of signal input from the triode 52. In the plate circuit of the gas triode 57 is placed in series, a relay 58, which is operated by the plate current, and a switch 59, which is operated by a mechanical connection 51 from the scan-jam switch 29.

In the operation of the relay circuit 27x the arm 17x of the transmitter selector switch 15x will, in the course of its travel, arrive at the terminal 16a, which will be considered as energized with an activating voltage as described above. This activating voltage passing thru the switch 15x and is impressed upon the grid 53 of the triode 52 and thence to the grid 60 of the gas triode 57. Due to the well-known action of gas triodes, the application of signal to the grid 60 of the gas triode 57 causes this triode to initiate discharge. The triode 57 continues to discharge after the removal of signal from its grid 60, so that current in the plate circuit of gas triode 57 commences to flow as soon as the switch arm 17x makes contact with the terminal 16a. The current continues to flow indefinitely. Plate current of the gas triode 17 flows through the relay 58, the switch 59 being closed, and serves to release the clutch 24. This action stops the rotating arm 17x from further rotation, leaving the arm 17x connected to the terminal 16a, and also stops the sweep of the tuning element 25x of the transmitter 26x, leaving the transmitter tuned to a frequency within that channel which is associated with the channel conductor 14a.

It is important to observe that the sweeps of the channel selector switch 9 and of the transmitter selector switch 15x are not synchronized and need not be at the same rate. It may be observed that the angular spacing of the contacts 12a, 12b, and 12c, etc., in the channel selector switch 9, may be adjusted to bring the associated channel conductors into the desired relation with the successive positions of the tuning element 3 of the receiver 2. In a like manner, the contacts 16a, 16b, 16c, etc. may be spaced to bring them into the desired relation with the successive positions of the tuning element 25x in the transmitter 26x. It is not necessary that the spacing of the contacts 16a, 16b, 16c, etc follow the spacing of contacts 12a, 12b, 12c, etc. except, of course, that they be in proper order. The tuning element 25x, in its frequency sweep, is entirely independent of the tuning element 3 in its frequency sweep.

The switch 56 in the relay circuit 27x is closed by the action of the relay 58 and remains closed so long as the relay 58 is energized. The action of the switch 56 preferably is somewhat slow, so as not to take place until after the relay 58 has completely opened the clutch 24x. When the switch 56 closes it puts a short to ground across the resistor 19a and the contacts 16a, and 16p, so that there can no longer be any voltage at the contacts 16a and 16p due to discharge through the neon tube 18a. The overall effect of this operation is to remove activating voltage from the conductor channel 14a as soon as that activating voltage has operated to set the transmitter 26x on frequency. When the transmitter selector 15y, in its sweep brings the switch arm 17y into engagement with the contact 16p, there will be no activating voltage operating at the contact 16p and the transmitter selector switch 15y will continue on past in its sweep until it arrives at some other terminal, which may be activating by some other intercepted frequency. One intercepted signal therefore, never operates to tune both transmitters 26x and 26y to the same frequency. Each transmitter 26x or 26y will be tuned to a separate intercepted frequency. The rare occasion when the switch arms 17x and 17y would contact simultaneously the same conductor channel may be disregarded. It can be shown that if such occurred, the two transmitters would stay tuned to the same frequency for only a few cycles of the scan-jam cycle. The structure and operation of the relay circuit 27y is similar to that of 27x, and need not be described.

The preceding description is primarily of the scanning phase of the cycle of the scan-jam switch 29. At the commencement of the jamming phase of the cycle, the blanking signal is withdrawn from the circuit 30, and the transmitters 26x and 26y commence jamming transmission on the frequencies to which they have been tuned during the preceding scanning phase. These transmission frequencies are within the channel band-width of the intercepted signals by which they were tuned. It is desirable that the transmitters 26x and 26y be noise-modulated and that they cover a frequency band at least as wide as the channel band-width. During the jamming phase, blanking signal is put upon the circuit 31. This causes the receiver 2 to be greatly reduced in sensitivity so that the transmitted signals do not overload it, and so that intercepted signals are too weak to be received. Thus, during the jamming phase only signals from the transmitters 26x and 26y appear on the cathode ray tube 8. The transmitted signals are differentiated from the intercepted signals in the cathode ray presentation by the polarity switch 6 which reverses the polarity of its pulse output by the operation of the blanking circuit 31. This reversal of polarity makes the pips appear in the presentation due to jamming signal turn in the opposite direction from those representing intercepted signal. This reversal of polarity also prevents pulses due to transmitted signal from triggering off any of the neon tubes 18a, 18b, 18c, etc. since the pulse, being now of reversed polarity, acts to decrease the voltage across these tubes rather than increase it, as occurs during the scanning phase.

The jamming phase preferably lasts much longer than the scanning phase and the speed of rotation of the transmitter selector switches 15x and 15y, and of the clutches 24x and 24y, are appreciably slower than that of the channel selector switch 9, or of the tuning element 3 in the receiver 2. It is possible to stop the sweep of the tuning elements 25x and 25y in the transmitters 26x and 26y within the period of time that is required for the switch arms 17x and 17y to sweep over a single frequency channel.

At the beginning of each scanning cycle, the switch 59 is opened momentarily by the scan-jam switch 29, for the purpose of permitting the transmitters 26x and 26y to be retuned, if necessary. In the absence of voltage on the grid of the triode 52, the momentary opening of the switch 59 would stop the discharge in the gas triode 57. Plate current through the relay 58 then fails. This permits the clutch 24x to re-engage, and the tuning element 25x to start to sweep through its tuning range. A failure of current in the relay 58 also causes the switch 56 to open and permit any activating voltages on the contacts 16a, 16b, 16c, etc. to operate in a manner that has been described hereinbefore. Normally, an intercepted signal will stay on frequency continuously. It is desirable, therefore, that the transmitter 26x stay tuned to that frequency continuously also, and not have to be retuned at every repetition of the scan-jam cycle.

During a first scanning phase if the transmitter 26$x$ has been tuned to the frequency channel of the channel conductor 14$a$ and the rotating arm 17$x$ has been stopped on the contact 16$a$, it will stay on contact 14$a$ all through the succeeding jamming phase. At the beginning of the second scanning phase, the switch 59 opens quenching the discharge of the gas tube 57 and this opens the relay 58 for want of plate current. This also opens the switch 56 promptly and starts the closing of the clutch 24$x$. This clutch 24$x$ is arranged, however, to close relatively slowly. Before the clutch 24$x$ closes, the tuning element 3 of the receiver 2 has swept thru its complete range of frequency, and intercepted signals have caused the striking of those particular neon tubes from among all the tubes 18$a$, 18$b$, 18$c$, etc., that are associated with the frequency channels in which the intercepted signals lie. If the intercepted signal that lies within the frequency channel of the channel conductor 14$a$ is still present, the neon tube 18$a$ will again strike. The switch 17$x$ in the relay circuit 25$x$ being stationary on the terminal 16$a$, this striking immediately puts signal voltage upon the grid 53 of the triode 52. The gas triode 57 in turn strikes, restoring plate current thru the relay 58. This plate current operates to hold the clutch 24$x$ open before it has had time to close. Thus no returning of the transmitter 26$x$ takes place as long as the intercepted signal to which it is once tuned stays on frequency.

It is desirable that intercepted signals from friendly transmitters be not jammed, so that friendly communications received be not interfered with. In this case, the frequency channel on which such signal appears, may be rendered free from jamming by the present device, by opening the key 13$a$, 13$b$, 13$c$, etc., in the circuit to the channel conductor 14$a$, 14$b$, 14$c$, etc., that covers the frequency channel in question. The channel conductor containing the frequency in question will then be inoperative to tune the transmitters 26$x$ and 26$y$.

A form of preferred device for accomplishing the effects desired of the polarity switch 6, is shown in Figure 2. In this part of the device, the intermediate frequency output of the receiver 2 is led to two diode detectors 32 and 33 that are connected in opposite polarity, so as to pass pulses of opposite polarity on to the amplifier 34 and 35, respectively. The blanking circuit 31 is connected to the amplifier 34 and puts a blanking signal on the amplifier 34 during the jamming phase, but permits it to function normally during the scanning phase. The blanking circuit 30 in a similar manner, is connected to the amplifier 35 and permits the amplifier 35 to function during the jamming phase of the cycle but blanks it during the scanning phase of the cycle. By this means, the polarity switch 6 accomplishes the desired result. The amplifier 34 puts out a signal of one polarity during the scanning phase, and the amplifier 35 puts out a signal of opposite polarity during the jamming phase. The output of the amplifier 35, which carries the pulse due to the jamming signals from the transmitters 26$x$ and 26$y$, is connected directly to the signal terminal of the oscilloscope 8. The output of the amplifier 34, which carries the pulses due to intercepted signal, is connected to the pulse sharpener 7.

The details of the circuit of the pulse sharpener 7 are shown in Fig. 2. The purpose of the pulse sharpener 36 is to insure that strong signals will act only within their true frequency channel and will not spread over into operation on adjacent channels. In this part of the device the signal is passed to two parallel circuits. In one of these circuits the signal passes through an amplifier 37 and appears as a negative pulse on a second control grid 42 of a pentagrid mixer tube 40. In the other parallel circuit the signal passes through the differentiating circuit 38 and thru an amplifier 39 and appears on a first control grid 41 of the petagrid mixer tube 40. These control grids are provided with suitable bias voltages, not shown. These biases are such that in the absence of signal, a normal plate current from the tube 40 flows through the plate load 43.

It is characteristic of a pentagrid mixer tube that plate current will flow if either control grid is positive. During the growth of a pulse signal the first signal grid 41 has a positive signal due to the presence on it of the positive first derivative of the pulse signal as formed by the differentiating circuit 38. The presence of the pulse signal itself, as a negative voltage on the second control grid 42 at this time, does not act to reduce plate current. When the pulse has reached its maximum the derivative signal on the first control grid 41 falls to zero, and the negative signal on the second control grid 42 is then effective in rapidly cutting the plate current below its normal value. A sharp rise in voltage appears across the plate load resistor 43 just at the instant that the receiver 2 is tuned exactly to the intercepted signal.

A cathode-grid circuit of a gas triode 44 that is normally non-conducting is connected across the resistor 43. A sudden rise in the voltage across the resistor 43 increases the grid voltage of the gas triode 44 and suddenly triggers on the plate current of this tube. This initiates a sharp pulse in the primary of the transformer 45 that is located in the plate circuit of the gas triode 44. This pulse then reappears in the secondary of this same transformer 45. This pulse signal is then carried to the signal terminal of the oscilloscope 8, and also to the switch arm 10 of the channel selector switch 9. By this means, a very sharp pulse of signal appears on the channel selector switch 9 just at the instant that the receiver 2 is exactly tuned to the intercepted signal. There can be no anticipation of signal at this point due to the strong signal passing receiver 2 before the receiver 2 is exactly tuned thereto.

The plate cathode circuit of the gas tube 44 contains a resistor 47 in series with the voltage supply 46. A capacitor 48 is connected across the resistor 47 and the voltage supply 46 in series. By means of this circuit, after each discharge of the tube 44, plate current is gradually cut off and the tube prepared for the transmission of another signal pulse.

The transmitter 26$y$, and its associated motor 22$y$, clutch 24$y$, relay circuit 25$y$, and transmitter selector switch 15$y$ are all similar in design and operation to the corresponding transmitter 26$x$, motor 22$x$, clutch 24$x$, relay circuit 25$x$, and transmitter selector switch 15$x$.

The manner of the simultaneous working of the two sets of $x$ and $y$ equipment is clear to one skilled in the art. The addition of a third or fourth transmitter to the device already disclosed, in the same manner in which the second transmitter 26$y$ and its associated equipment has been added to the first transmitter 26x, is within the scope of the present invention. It also is within the scope of the present invention to arrange the transmitter 26y to cover a different frequency range from that of the transmitter 26x. In such an arrangement, the switch 56 may be dispensed with, since a simultaneous selector of the same frequency by transmitter selector switches 15x and 15y would not occur.

It is to be understood that the circuits and the components thereof that have been disclosed and described herein have been submitted for the purposes of illustrating and explaining suitably operating embodiments of the present invention, and that modifications, substitutions and changes therein may be made without departing from the present invention.

What I claim is:

1. In a radio receiver-transmitter of the character described, comprising in combination a scanning receiver periodically covering a range of frequencies, a signal holding means continuously registering the presence of signals intercepted by said receiver according to their frequency, a radio transmitter tuned periodically through a range of frequencies, and means coupled to said registering means for effecting the stopping of the tuning of said transmitter at the frequency registered by said holding means and causing said transmitter to transmit a signal of the registered frequency.

2. In an automatically tuned radio transmitter of the character described, comprising in combination a scanning receiver automatically tuned over a range of frequencies, a plurality of channel conductors connected successively to the output of said receiver, means tuning said transmitter through a range of frequencies, means connecting a transmitter relay successively to said channel conductors in such manner that each one of said channel conductors is connected to the transmitter relay when the transmitter is tuned through that band of frequencies through which the receiver is tuned when it also is connected to such one channel conductor connected to the transmitter relay, means responsive to the output signal from said receiver for activating said relay through one of said channel conductors to stop the tuning of said transmitter within the frequency band associated with said channel conductor and to initiate transmission by said transmitter.

3. In a radio receiver-transmitter set of the character described, comprising in combination, a transmitter, a receiver, an automatic means for tuning said transmitter to a frequency intercepted by said receiver, a plurality of frequency-associated channel conductors in said transmitter automatic tuning means, means by which one of said channel conductors receives a triggering signal when said receiver intercepts a signal within the associated frequency band of such one channel conductor, and a gas filled electronic tube which is triggered into steady discharge by the triggering signal and which is in electrical contact with such one channel conductor receiving a triggering signal.

4. In a radio scanning receiver-transmitter set of the character described, comprising in combination a scanning receiver covering periodically a range of frequencies, a plurality of registering devices, of predetermined individual frequency bands, means for registering on the plurality of registering devices the approximate frequencies of signals intercepted by said receiver and for holding same in registration for an appreciable period of time, a plurality of transmitters periodically tuned through a predetermined range of frequencies, means whereby a first registering device registering an intercepted signal stops the tuning of one of said transmitters within the frequency band of the first registering device, means whereby a second registering device registering a second intercepted signal stops the tuning of a second transmitter within the frequency band of the second registering device, and means whereby the first registering device after having stopped the tuning of the first transmitter does not stop the second transmitter within the same frequency band.

5. In a device of the character described, comprising in combination a scanning receiver for the reception of intercepted signals and periodically sweeping a predetermined range of frequencies, a plurality of channels, a first selecting means for applying an intercepted signal according to its frequency to a given one of said channels, a transmitter periodically tuned thru a frequency range that is inclusive of the frequency of the intercepted signal, said transmitter having normally inoperative means therein for stopping the tuning thereof, and second selecting means coupled sequentially between each channel and said normally inoperative means in synchronism with the tuning of said transmitter for rendering said normally inoperative means operative in response to said second selecting means being coupled to said given one of said channels, whereby said transmitter transmits a signal at the frequency of the signal intercepted by said scanning receiver.

6. In a radio jamming system of the character described comprising in combination a scanning receiver periodically tuned over a predetermined range of frequencies for the reception of intercepted signals, a transmitter, means for detecting the received signals, a plurality of channels, each of said channels being adapted to accept discrete detected pulses corresponding to signals intercepted within a finite band of frequencies, channel selecting means for routing said detected pulses to their respective channels, pulse shaping means coupled between said channel selecting means and said detector means to confine said detected pulses within their respective channels, said pulse shaping means comprising a mixer tube having a first and second control grid, a differentiating circuit responsive to said detected pulses, means for coupling the output of said differentiating circuit to said first control grid simultaneously with the application of said detected pulse to said second grid to produce a peaked output pulse from said mixer tube at the instant that said scanning receiver is exactly tuned to the frequency of the intercepted signal, and means responsive to said peaked output pulse for triggering said transmitter.

7. A receiver-transmitter system comprising in combination a scanning receiver tuned over a range of frequencies including a plurality of frequency channels, a plurality of signal holding means, one corresponding to each of said channels, first coupling means for sequentially coupling the output of said receiver to each of said holding means in synchronism with the scanning of said receiver to effect the energization of a respective holding means in response to an intercepted signal of said receiver having a frequency lying within a respective frequency channel, at least one transmitter having means for scanning the tuning thereof over a range of frequencies, means effective when rendered operative by an energized holding means in stopping the scanning of said transmitter at a given frequency, and second coupling means for sequentially coupling said scanning-stopping means to selected ones of said holding means in synchronism with the scanning of said transmitter, whereby the transmitter transmits a signal having a frequency determined by the frequency channel of a signal intercepted by said receiver.

8. A system according to claim 7 further comprising pulse sharpening means connected between said receiver and said first coupling means for confining the duration of signals intercepted by said receiver within the period occupied by the switching of said first coupling means between respective sequential frequency channels.

9. A receiver-transmitter system comprising a scanning receiver tuned over a range of frequencies including a plurality of frequency channels, a plurality of signal holding means, one corresponding to each of said channels, first coupling means for sequentially coupling the output of said receiver to each of said holding means in synchronism with the scanning of said receiver to effect the energization of a respective holding means in response to an intercepted signal of said receiver having a frequency lying within a respective frequency channel, at least one transmitter having means for scanning the tuning thereof over a range of frequencies including at least a portion of said frequency channels, means effective when rendered operative by an energized holding means in stopping the scanning of said transmitter at a given frequency, and second coupling means for sequentially coupling said scanning-stopping means to selected ones of said holding means in synchronism with the scanning of said transmitter so that during the interval that said second coupling means are coupled to a respective holding means registering a given frequency channel, said transmitter is tuned to a frequency lying within said given frequency channel, whereby said transmitter transmits in a frequency channel including the frequency of an intercepted signal of said receiver.

10. A system according to claim 9, further comprising control means for effecting the operation of said transmitter for intermittent intervals and for decreasing the sensitivity of said receiver during said intermittent intervals so that only locally transmitted signals are received; polarity switching means connected between the output of said receiver and said first coupling means and controlled by said control means for reversing the polarity of said receiver output signals during said intermittent intervals, and an oscilloscope connected to the output of said polarity switching means for visually displaying intercepted signals of said receiver as a function of frequency, whereby remotely transmitted signals intercepted by said receiver are distinguished from locally transmitted signals.

11. A system according to claim 10 wherein said holding means are such as to be energizable only by signals from said receiver having that polarity which exists between intermittent intervals, whereby locally transmitted signals intercepted by said receiver are not effective in energizing said storage means.

12. A system according to claim 10 wherein said polarity switching means comprises first and second circuits, each including a rectifier connected to produce an output signal therefrom, having respectively opposite polarities with respect to each other in response to an alternating signal from the output of said receiver, and wherein said control means comprises a motor-driven switch for connecting a blanking voltage to said receiver and to said first circuit of said polarity switch during said intermittent intervals, and for connecting said blanking voltage to said transmitter and to said second circuit of said polarity switch between said intermittent intervals.

13. A system according to claim 12 wherein said control means further includes means for de-energizing all of said holding means at the end of each intermittent interval.

14. A system according to claim 12 wherein said control means further comprises means for rendering said transmitter-scanning-stopping means inoperative at the end of each intermittent interval, whereby the scanning of said transmitter is resumed.

15. A system according to claim 12 further comprising pulse sharpening means connected between said first circuit of said polarity switch and said first coupling means for confining the duration of remotely transmitted signals intercepted by said receiver within the period occupied by the switching of said first coupling means between respective sequential frequency channels.

16. A system according to claim 9 further comprising pulse sharpening means connected between said receiver and said first coupling means for confining the duration of signals intercepted by said receiver within the period occupied by the switching of said first coupling means between respective sequential frequency channels.

17. A system comprising a means for providing over a period of time a succession of direct current signals, a plurality of holding means, each of said holding means including a gas-filled tube and a source of direct current voltage in series with said tube having a magnitude great enough to maintain discharge therethrough but less than that needed to initiate discharge therethrough, at least one utilizing means which is rendered operative when coupled to an energized holding means, first means for sequentially applying said direct current signals to each of said holding means in series with said direct current voltage, the combined voltage being great enough to initiate discharge through said tube, and, thereby energize said holding means, and second means for sequentially coupling said utilizing means to at least a portion of said holding means.

18. A system according to claim 17 further comprising a pulse sharpening means connected between said direct-current producing means and said first coupling means for confining the duration of each direct-current signal within the period occupied by the switching of said first coupling means between each respective holding means.

19. In combination a radiant energy receiver, a radiant energy transmitter, and means energized by a signal in said receiver for sensing the presence of a received signal in said receiver to control the operation of said transmitter, said sensing means including means for holding a signal for a given period upon a signal being received by said receiver, normally inoperative controlling means for said transmitter, and means connecting said holding means to said controlling means at stated intervals, said controlling means rendered operative in response to a signal being applied thereto from said holding means, whereby said transmitter is controlled upon the appearance of a signal in said receiver.

20. A combination according to claim 19 wherein said sensing means further includes means for effecting a connection at stated intervals from said receiver to said holding means.

EVERARD M. WILLIAMS.

REFERENCES CITED

The following references are of record in the file of this patent:

UNITED STATES PATENTS

| Number | Name | Date |
|---|---|---|
| 2,114,036 | Smith et al. | Apr. 12, 1938 |
| 2,118,626 | Smith | May 24, 1938 |
| 2,209,273 | Hills | July 23, 1940 |
| 2,412,991 | Labin | Dec. 24, 1946 |
| 2,418,139 | Preisman | Apr. 1, 1947 |
| 2,424,984 | Hoffman | Aug. 5, 1947 |
| 2,438,904 | De Rosa | Apr. 6, 1948 |
| 2,452,601 | Ranger | Nov. 2, 1948 |